Figure 4:
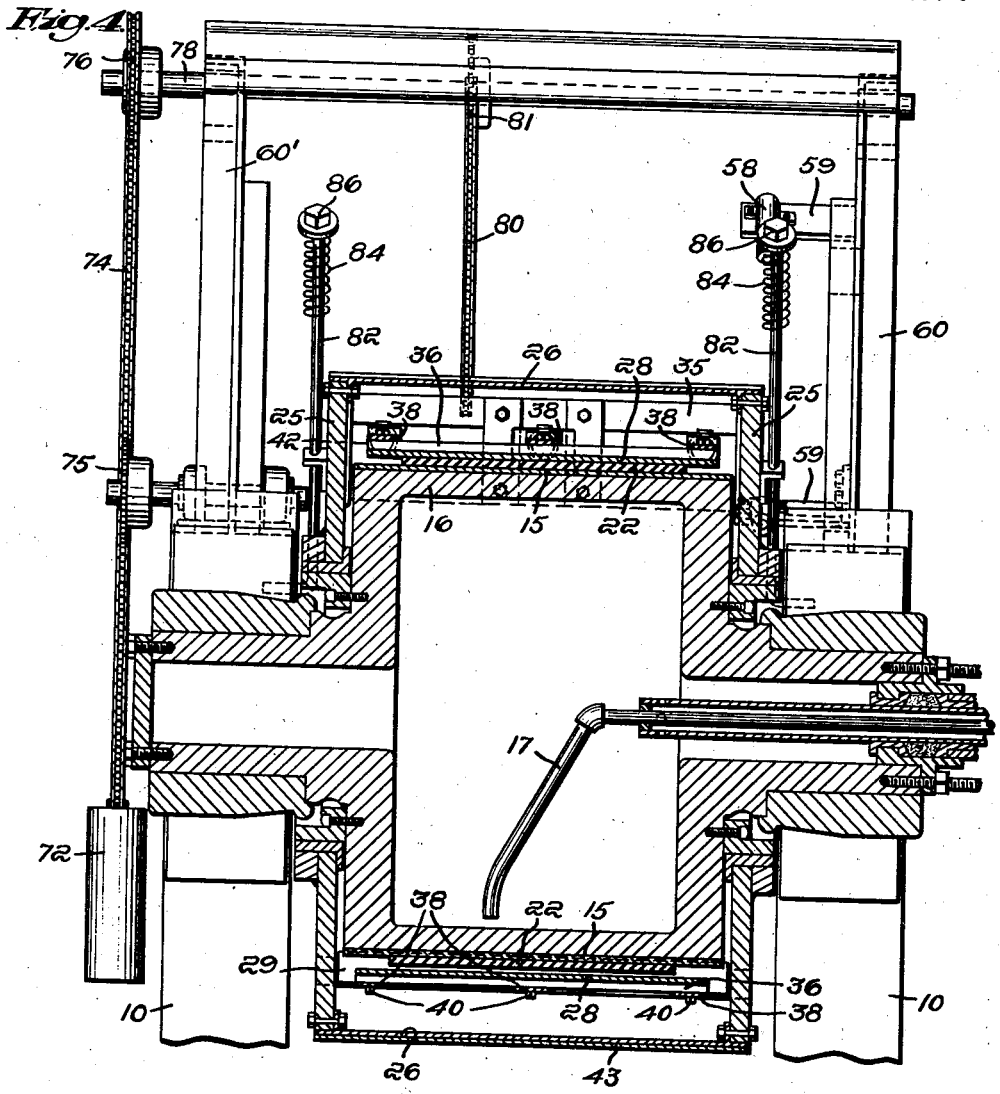

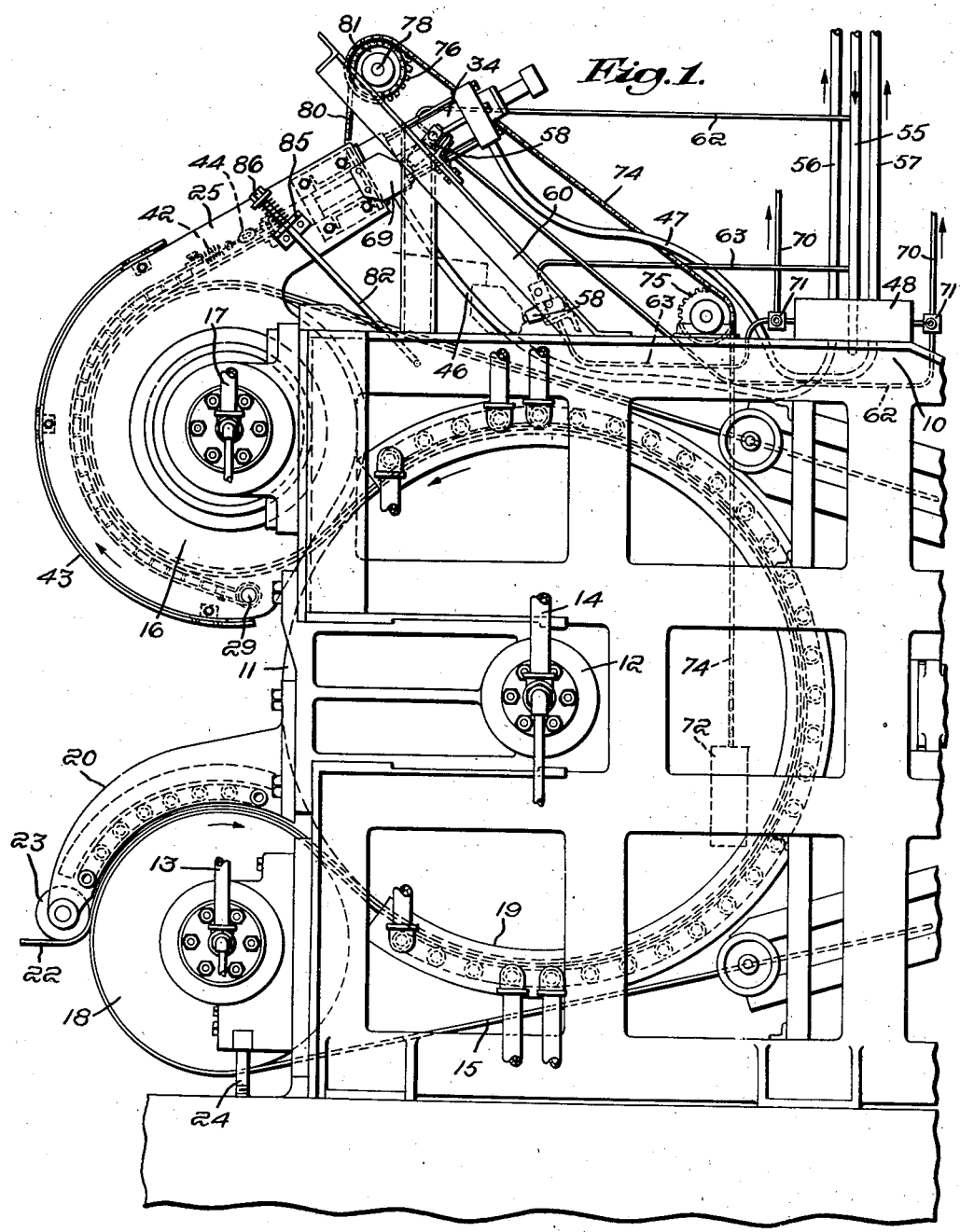

June 20, 1944.   T. M. KNOWLAND ET AL   2,351,861
VULCANIZING METHOD AND APPARATUS
Filed Jan. 23, 1942   4 Sheets-Sheet 2
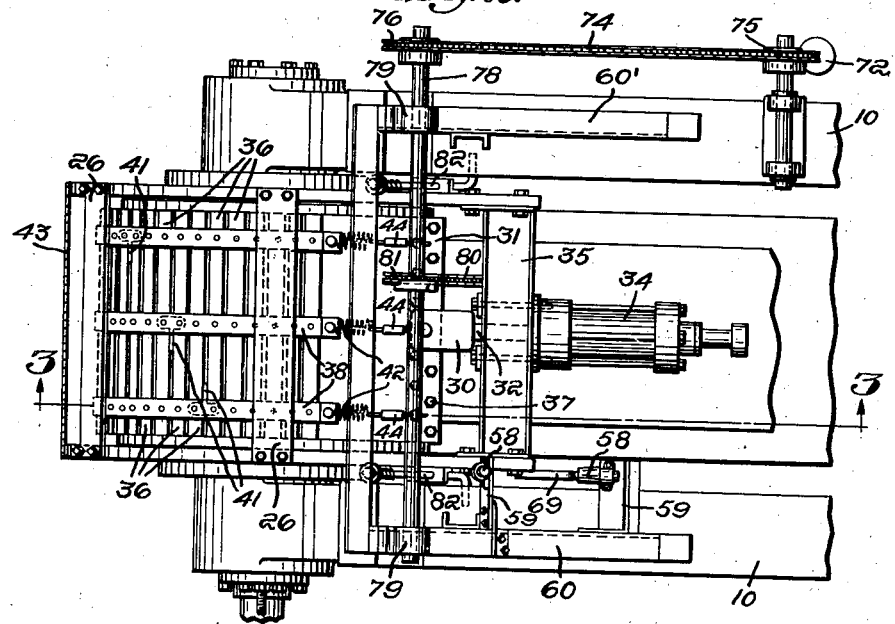
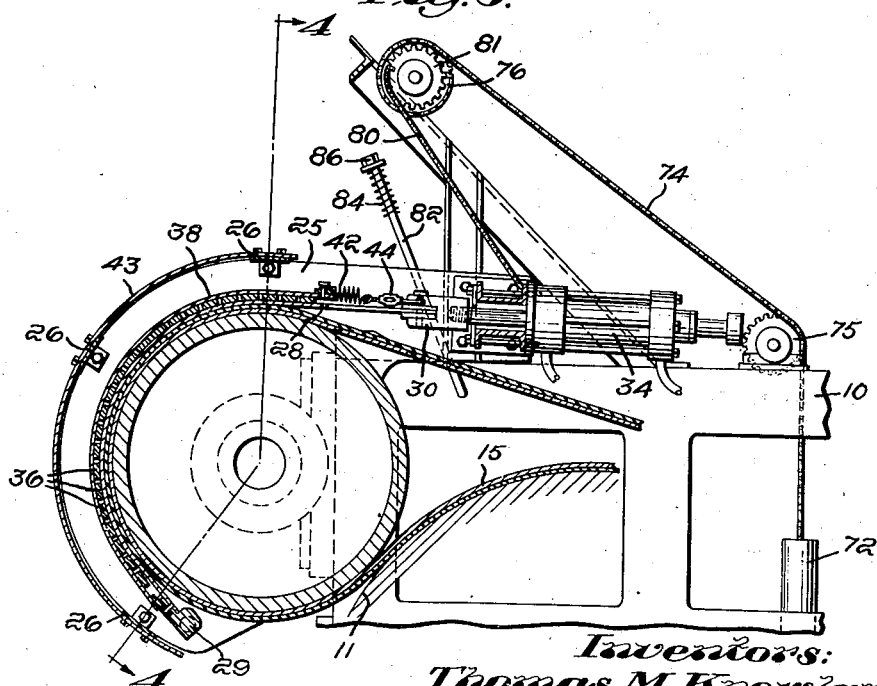
Inventors:
Thomas M. Knowland,
William C. Bleher;
by Kenway & Witter
Attorneys June 20, 1944.  T. M. KNOWLAND ET AL  2,351,861
VULCANIZING METHOD AND APPARATUS
Filed Jan. 23, 1942  4 Sheets-Sheet 3

Inventors:
Thomas M. Knowland,
William C. Bleher,
by Kenway & Witter
Attorneys

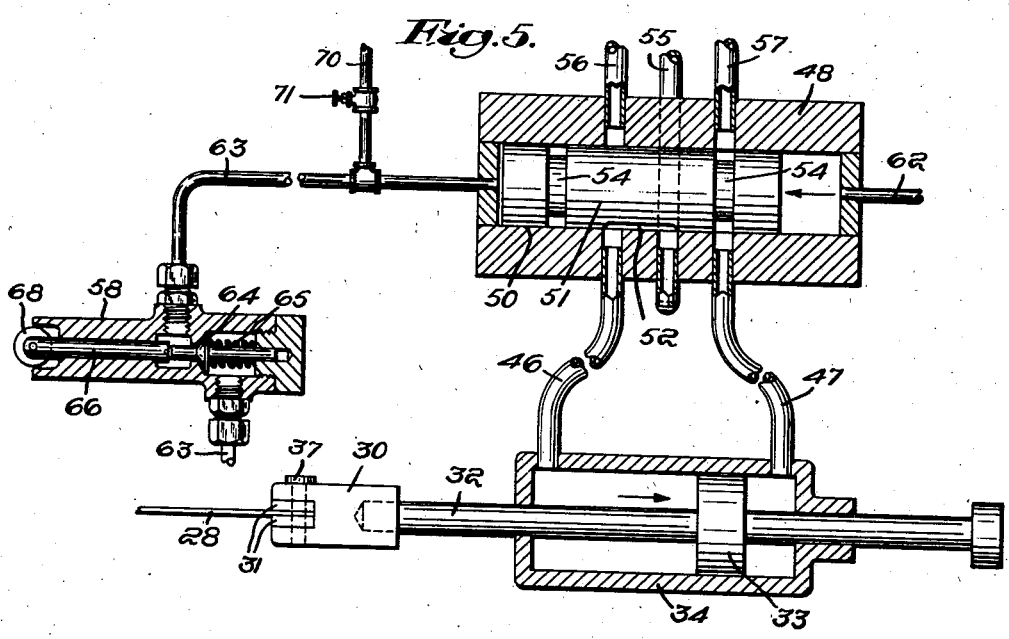

Patented June 20, 1944

2,351,861

UNITED STATES PATENT OFFICE 2,351,861

VULCANIZING METHOD AND APPARATUS

Thomas M. Knowland, Belmont, and William C. Bleher, Boston, Mass., assignors to Boston Woven Hose & Rubber Company, Cambridge, Mass., a corporation of Massachusetts Application January 23, 1942, Serial No. 427,948

16 Claims. (Cl. 18—6)

This invention relates to novel method and apparatus for continuously vulcanizing strip material such as rubber belting, flooring and the like, and more particularly to the employment of a supplemental curing step and novel mechanism for supplementing known continuous vulcanizing machines to the end of substantially increasing the present known rate of production. Continuous vulcanization of strip material is at present carried out by vulcanizing machines of the nature shown in Bierer Patent No. 2,039,271 dated April 28, 1936, in which is employed a heated vulcanizing cylinder and an endless band tensioned about the cylinder and adapted to receive between the band and cylinder strip material to be vulcanized, the tension on the band providing the vulcanizing pressure of the strip material against the cylinder. The uncured strip to be vulcanized is fed into the bite between the band and cylinder and is shaped and cured during its passage around a substantial arcuate portion of the cylinder. The operation is continuous and movement of the strip is necessarily slow to effect a complete cure. One object of the invention herein disclosed is to provide a supplemental curing step and mechanism supplemental to the machine for receiving the strip from the machine in semi-cured condition and effecting a completion of its cure, whereby permitting a substantial speeding up of the machine and substantial increase in its production.

While the invention relates particularly to the continuous vulcanization of strip material, the supplemental step particularly comprised within the invention can function continuously or intermittently on the continuously moving strip. The invention contemplates passage of the uncured strip through a vulcanizing path at a rate sufficient to effect a semi-cure and continued passage thereof to and through a second and supplemental vulcanizing path to complete the cure. This second step employs a continuously moving vulcanizing surface for supporting and carrying the strip and a cooperating vulcanizing surface for engaging the opposite face of the strip and holding it in pressure contact with the supporting surface. The said cooperating surface is arranged to engage the outer face of the strip and move therewith and, in the preferred form of the invention, means is provided for (1) holding this surface in pressure contact with the strip during a predetermined travel thereof with the strip, (2) releasing the surface from such pressure contact and quickly advancing it over the strip to a predetermined forward position, and (3) reengaging the surface with the strip, means being provided for continuously effecting the releasing, advancing and engaging operations automatically and in sequence. Production of a method and apparatus for serving these operations to the end of substantially increasing the output of known methods and machines for vulcanizing strip material comprises a further object of the invention.

These and other features of the invention will be best understood and appreciated from the following description of preferred methods of putting the invention into practice, disclosed in connection with the illustrative apparati shown in the accompanying drawings, in which:

Fig. 1 is a fragmentary side elevation of a continuous vulcanizing machine embodying the invention, Fig. 2 is a top plan view thereof, Fig. 3 is a sectional view taken on line 3—3 of Fig. 2, Fig. 4 is a sectional view taken on line 4—4 of Fig. 3, and Fig. 5 is a fragmentary sectional view illustrating certain controlling and operating mechanism.

In the accompanying drawings, we have illustrated our invention in connection with the continuous vulcanizing machine shown in Patent No. 2,039,271. This machine embodies a heavy metal frame comprising spaced side members 10 of similar shape rigidly connected and supported on a concrete foundation. The frame is designed to support three drums or rolls over which passes a tension band in a generally triangular path with a reentrant loop extending about the periphery of a large vulcanizing cylinder supported by the frame within the general outline of the path of the band.

The vulcanizing cylinder or drum 11 is supported for rotation in bearings 12 and is heated by steam from pipes 14. The periphery of the drum provides a vulcanizing surface and cooperating therewith is an endless steel pressure band 15 passing about a substantial arcuate portion of the drum, about arcuate portions of upper and lower rolls 16 and 18, and about a rearwardly located band tensioning roll (not shown). The rolls 16 and 18 are steam heated from pipes 13 and 17 in like manner as the drum 11. The drum 11 and roll 18 are also provided with curved steam heaters 19 and 20 located closely adjacent to the band 15 thereon and cooperating with the drum and roll to provide vulcanizing heat to both sides of strip material passing through the machine.

The belting 22 or other strip material to be cured is passed into the machine beneath a roller 23 carried on the outer end of the heater 20 and thence into contact with the band 15 on the roll 18. During its passage through the housing 20, the belting is heated substantially to the vulcanizing temperature and, when it passes into the bite between the band and the drum, it is subjected to severe pressure due to the high tension under which the band is held, this pressure being particularly severe between the drum and the roll 18 since the roll is pressed positively toward the drum by screw threaded means 24. After the belting passes onto the vulcanizing drum 11 and beneath the band 15, it travels substantially 300° in contact with the circumference of the drum, being meanwhile subjected to the pressure of the tension band and to the vulcanizing heat of the drum and the circumferential heater 19.

In the machine illustrated in said patent the belting strip is molded into conformity with the surface of the drum and completely vulcanized uniformly at and between its opposed faces during its passage through this arcuate path around the drum. The requirement that the vulcanization shall be completed during such passage very substantially limits the speed of movement of the belting and therefore the productive capacity of the said patented machine. The primary object of our invention resides in the provision of further efficient and economical steps and mechanism for so supplementing this previously known vulcanizing operation and machine as substantially to increase their productive capacity. The mechanism which we have herein illustrated for this purpose will now be described.

Mounted for rotation on the hubs of the roll 16 is a frame comprising side members 25 connected by cross plates 26. Disposed between the two side members is a flexible steel pressure band 28 located in close proximity to the peripheral surface of the roll. The front end of the band is connected to a rod 29 supported at its ends in the two side members. The rear end of the band is connected to a head 30 on the forward end of a rod 32 actuated by a piston 33 within a cylinder 34 supported on a cross piece 35 connected at its ends to the side members 25. It will be apparent that fluid pressure in the cylinder forwardly of the piston therein will draw the rod and head 30 rearwardly and tension the band into contact with the belting 22 on the endless band 15 disposed about the roll 16. The rear end of the band is secured to the head 30 between two transversely extending plates 31 clamped tightly onto the band by tap screws or bolts 37.

The belting 22 being vulcanized is thus adapted to be engaged between the pressure band 28 and the band 15 on the roll 16 (Fig. 3), and the vulcanizing operation is facilitated by providing vulcanizing heat at both surfaces of the belting. The peripheral surface of the roll and the band 15 thereon are steam heated and we prefer also to heat the band 28. In the drawings, we have illustrated the following described means for performing this function electrically.

A plurality of resistance heaters in the form of spaced and parallel bars 36 are mounted on three narrow steel bands 38 as by means of screws or rivets 40. The front ends of these bands are attached to the rod 29 to which the pressure band 28 is also attached. The rear ends of the bands 38 are connected to springs 42 in turn connected to the piston rod head 30, turnbuckles 44 being provided in the connections whereby to give the desired tension to the springs. The heating elements 36 are located between the bands 38 and the pressure band 28 in such position that the springs hold these elements continuously in contact with the outer surface of the pressure band in which position they heat the pressure band. The heating action of the units 36 is controlled by suitable thermocouples 41 connected to certain of the units and cooperating relays and controls not herein illustrated. We also preferably provide a guard 43 mounted on the plates 26 and disposed about the heating units 36, the guard serving to house this vulcanizing unit and conserve the vulcanizing heat.

When the pressure band is thus held in contact with the belting, the band 28 and the frame 25 travel rearwardly with the belting. The following described means is provided for continuing this engagement and travel through a predetermined distance and then automatically releasing the band from such engagement and quickly advancing the band and frame to their foremost position whereat the band is again reengaged with the belting. This means operates to effect these releasing, advancing, and engaging operations in sequence and automatically.

Fluid pressure is provided to opposite ends of the cylinder 34 through flexible hose connections 46 and 47 and flow of oil or other fluid to and from the cylinder passes through a valve member 48 and is controlled automatically through the following mechanism. The member 48 is bored at 50 to receive a valve piston 51 recessed along one side at 52 and annularly recessed at two spaced locations 54 therealong. Fluid pressure is supplied from a pump to the recess 52 through a pipe 55 disposed centrally between the ends of the bore. The hose connections 46 and 47 communicate with the bore at opposite sides of the pipe 55 and fluid exhaust pipes 56 and 57 are in communication with the bore in alignment with the pipes 46 and 47. The arrangement is such that when the piston 51 is in the position of Fig. 5 the hose connection 46 is in communication with the fluid pressure pipe 55 through the recess 52 and the pipe 47 is in communication with the exhaust pipe 57 through one annular recess 54. In such position of the piston fluid under pressure flows to the front end of the cylinder 34 and moves the piston 33 therein rearwardly to tighten the flexible pressure band 28. When the piston 51 is moved longitudinally to its rear position fluid under pressure flows through hose 47 to the rear end of the cylinder and moves the piston 33 forwardly to release the band from engagement with the belting.

The piston 51 is moved automatically and alternately into its two extreme positions to effect these functions by the following mechanism. Two pilot valves 58 are mounted by brackets 59 on a rail 60 secured to the main frame 10 adjacent to one of the side members 25. Means including piping 62 provides a duct from the fluid pressure pipe 55 through the upper pilot valve to the rear end of the bore 50 and means including piping 63 provides a duct from the fluid pressure pipe 55 through the lower pilot valve to the forward end of the bore. Each pilot valve 58 (Fig. 5) has a valve unit 64 normally held by a spring 65 in position closing its said duct and in alignment with each unit 64 is a plunger 66 provided with a roller 68 on its free end. The pilot valves 58 are located in such spaced relation that their rollers 68 are alternately engaged by a bumper plate 69 carried on one of the side members 25. When the frame 25 oscillates counter-clockwise the plate 69 engages the roller 68 of the upper pilot valve whereby opening its duct and causing the piston 51 to move forwardly, and when the frame oscillates clockwise the plate 69 engages the lower pilot valve plunger whereby opening its duct and causing the piston 51 to move rearwardly. A limited amount of leakage back to the oil reservoir is provided at 70 to permit the escape of fluid trapped in the bore 50 at the ends of the piston 51, this leakage being controlled by valves 71.

The oscillatory unit supported by and including the two side plates 25 is normally counterbalanced in the forward direction, as by means of a weight 72. The weight is hung from a chain 74 extending upwardly over an idler 75 and having its top end attached to a toothed wheel 76 fixed to a shaft 78 supported in bearings 79 on the rails 60 and 60'. A second chain 80 has its bottom end attached to the cross bar 35 of the unit 25 and its top end is attached to a toothed wheel 81 fixed to the shaft 78. The weight acting through the chains and shaft normally counterbalances the unit to the forward position illustrated in Fig. 1. The unit is of substantial weight and suitable means, such as rods 82 and springs 84, is provided for checking the momentum of the unit at its extreme forward position. The lower ends of the rods are anchored to the frame 10 and their upper end portions pass through brackets 85 fixed to the plates 25, the springs 84 being disposed between the brackets and check nuts 86 on the rods. It will be apparent that, as the head approaches the springs under the counterbalancing action of the weight 72, the springs are engaged and compressed in a manner bringing the head to a gentle stop at its foremost position.

The operation of the machine is substantially as follows. The belting 22 moves continuously through the machine at a speed delivering it to the roll 16 in condition semi-cured uniformly at and between its opposed faces, and the belting continues to move continuously with the band 15 on and about the roll 16, the band serving to support the belting uninterruptedly during its passage from the vulcanizing path about the drum 11 to the vulcanizing path about the roll 16. When the head 25 is moved by the weight 72 to the forward position of Fig. 1, the bumper plate 69 opens the upper pilot valve 58 whereupon the piston 51 is forced forwardly to the position shown in Fig. 5. Fluid pressure from the pipe 55 thereupon flows into the forward end of the cylinder 34 and pushes its piston 33 rearwardly, whereby tightening and holding the band 28 in pressure contact with the belting. The entire unit 25 thereupon moves with the belting until the bumper plate 69 engages and opens the lower pilot valve 58 whereupon the piston 51 is forced to its rearmost position. Fluid pressure from the pipe 55 thereupon flows into the rearward end of the cylinder 34 and pushes its piston 33 forwardly, whereby releasing the band 28 from engagement with the belting. The weight thereupon acts quickly to return the head to its foremost position, illustrated in Fig. 1, whereupon the cycle above described is repeated. The band 28 is therefore in vulcanizing pressure contact with the belting during the major portion of travel of the belting beneath the band and this travel of the belting is sufficient to complete the vulcanizing operation thereon uniformly at and between said faces.

Having thus described our invention what we claim as new and desire to secure by Letters Patent of the United States is:

1. A method of curing belting or the like, which consists in continuously passing the belting longitudinally along a predetermined path defined in one part by heated surfaces in pressure vulcanizing contact with the belting and moving continuously therewith at a speed which delivers the belting therefrom in semi-cured condition, thereafter continuously passing the semi-curved belting longitudinally through another part of the path with one face in contact with a heated vulcanizing surface moving continuously therewith, holding the semi-cured belting in pressure contact with the heated vulcanizing surface by contact of a second heated vulcanizing surface with the other face thereof and moving with the first-named heated vulcanizing surface and belting, intermittently releasing the second heated vulcanizing surface from pressure contact with the belting, quickly advancing it to a more advanced position over the belting and re-applying it to the belting in said more advanced position, and effecting the releasing, advancing and re-applying steps continuously and in sequence.

2. A method of curing belting or the like, which consists in continuously passing the belting longitudinally along a predetermined path defined in one part by two heated surfaces in vulcanizing contact with opposite faces of the belting and moving therewith continuously at a speed which delivers the belting therefrom in semi-cured condition, passing the semi-cured belting longitudinally through another part of the path with one face thereof remaining in vulcanizing contact with one of the heated vulcanizing surfaces contacted thereby in the first part of the path, holding the semi-cured belting in contact with the said one heated vulcanizing surface in the second part of the path by contact of another heated vulcanizing surface with the other face thereof and moving with the first-named heated vulcanizing surface and belting, intermittently releasing the second heated vulcanizing surface from contact with the belting and re-applying it to a further oncoming portion of the belting not previously thus engaged, and effecting the releasing and re-applying steps alternately and continuously.

3. A method of curing belting or the like, which consists in continuously passing the belting longitudinally with one face in continuous contact with a heated vulcanizing surface continuously moving therewith in one direction, holding the belting in pressure contact with the heated vulcanizing surface by contact of a second heated vulcanizing surface with the other face thereof and moving with the first-named heated vulcanizing surface and belting, intermittently releasing the second heated vulcanizing surface from pressure contact with the belting after a predetermined travel therewith, quickly advancing the second heated vulcanizing surface over the belting in a direction opposite to said one direction and re-applying it to a further oncoming portion thereof not previously thus engaged, and effecting the releasing, advancing and re-applying steps continuously and in sequence.

4. A method of curing belting or the like, which consists in continuously passing the belting longitudinally in one direction along a curved path with one face in contact with a heated vulcanizing surface continuously moving therewith in said direction, holding the belting in pressure contact with the heated vulcanizing surface by contact of an opposing and arcuately curved heated vulcanizing surface with the other face thereof and moving with the first-named heated vulcanizing surface and belting, intermittently releasing the opposing heated vulcanizing surface from pressure contact with the belting after a predetermined travel therewith, advancing it over the belting and re-applying it to a further oncoming portion thereof not previously thus engaged, and holding the opposing heated vulcanizing surface in pressure contact with the belting during its travel therewith by placing such surface under tension longitudinally.

5. In a continuous vulcanizing machine, a heated vulcanizing roll mounted for rotation, a continuous pressure band passing about an arcuate portion of the roll, a flexible pressure band overlying an arcuate portion of the continuous band on the roll, means for tightening the flexible band into pressure engagement with belting or the like on the continuous band in a predetermined position at said arcuate portion of the roll and holding it thus engaged during a predetermined travel of the belting and band, means for releasing the flexible band and returning it over the belting to said predetermined position after a predetermined travel, and means for effecting the releasing, returning and tightening operations in sequence and automatically.

6. In a continuous vulcanizing machine, a heated vulcanizing roll mounted for rotation, a continuous pressure band passing about an arcuate portion of the roll, a flexible pressure band overlying an arcuate portion of the continuous band on the roll, a movable frame, means anchoring one end of the flexible band to the frame, power operated means carried by the frame and operative on the flexible band at its other end to tighten it into pressure engagement with belting or the like on the endless band in a predetermined position at said arcuate portion of the roll and hold it thus engaged during a predetermined travel of the belting and bands rearwardly from said predetermined position, means causing the power means to release the flexible band from said engagement after a predetermined travel rearwardly, means for returning the frame and flexible band to said predetermined position, and means for coordinating the releasing, returning and tightening operations in sequence and automatically.

7. A vulcanizing machine comprising a heated vulcanizing surface mounted for movement in one direction and adapted to carry belting or the like in vulcanizing contact therewith, means for driving said surface continuously in said one direction, a member providing a second heated vulcanizing surface arranged to engage the outer face of the belting, power operated means for causing the second vulcanizing surface to engage the outer face of the belting at a predetermined position of the member and hold it thus engaged during a predetermined travel of the member rearwardly with the belting, means for releasing the member from such engagement and returning it over the belting to said predetermined position after a predetermined travel thereof with the belting, and means for continuously effecting the releasing, returning and engaging operations automatically and in sequence, the third named means permitting said member to move freely with the belting when its vulcanizing surface is engaged therewith.

8. The vulcanizing machine defined in claim 7 wherein said power operated means is fluid pressure operated, a frame supporting the power operated means and the second heated vulcanizing surface, and means operated by movement of the frame for controlling the power operated means.

9. A vulcanizing machine comprising means providing a convex and arcuately curved heated vulcanizing surface mounted for movement in one direction and adapted to carry belting or the like in vulcanizing contact with said surface, a heated flexible pressure band having a vulcanizing surface overlying the first-named surface, means for tightening the flexible band into pressure engagement with belting or the like on the first surface and holding it thus engaged during a predetermined travel of the belting and band rearwardly, means for releasing the band and advancing it over the belting to the tightening position after a predetermined rearward travel, and means for effecting the releasing, advancing and tightening operations in sequence and automatically.

10. The vulcanizing machine defined in claim 9 plus electrically heated elements in closely spaced relation overlying the flexible band, and means connecting the elements and holding them in surface contact with the outer face of the flexible band.

11. A vulcanizing machine comprising means providing a convex and arcuately curved heated vulcanizing surface mounted for movement in one direction and adapted to carry belting or the like in vulcanizing contact with said surface, a frame mounted to oscillate substantially about the center of said curved surface, a flexible band overlying said surface and having one end anchored to the frame, a fluid pressure cylinder carried by the frame, a piston within the cylinder and connected to the other end of the band, means for normally rocking the frame forwardly to a predetermined position, means for causing the piston to tighten the band into pressure engagement with belting or the like on said surface and hold it thus engaged during a predetermined travel of the belting and band rearwardly, and means for causing the piston to release the band from such engagement at a predetermined point in said travel.

12. The vulcanizing machine defined in claim 11 plus a flexible heating element overlying the outer face of the flexible band, means anchoring the forward end of the element to the frame, and means including resilient means connecting the other end of the element to the piston and holding the element in surface contact with the outer face of the band.

13. In a continuous vulcanizing machine, a heated vulcanizing roll mounted for rotation, a continuous pressure band arranged to pass about an arcuate portion of the roll, a heated vulcanizing unit arranged to engage the outer face of belting or the like on the continuous band at said arcuate portion of the roll, means for causing the vulcanizing unit to engage the belting when the unit is in a predetermined position and hold it thus engaged during a predetermined travel rearwardly with the belting, means for releasing the vulcanizing unit from such engagement and returning it forwardly over the belting to said predetermined position after a predetermined travel thereof with the belting, and means for continuously effecting the releasing, returning and engaging operations automatically and in sequence.

14. In a continuous vulcanizing machine, a heated vulcanizing roll mounted for rotation, a continuous pressure band arranged to pass about an arcuate portion of the roll, a frame mounted to oscillate about the rotary axis of the roll, a heated vulcanizing unit carried by the frame and arranged to engage the outer face of the belting or the like on the continuous band at said arcuate portion of the roll, means for causing the vulcanizing unit to engage the belting when the unit is in a predetermined position and hold it thus engaged during a predetermined travel rearwardly with the belting, means for releasing the vulcanizing unit from such engagement and oscillating the frame forwardly to a position locating the vulcanizing unit in the said predetermined position after a predetermined rearward travel of the unit and frame with the belting, and means for effecting the engaging, releasing and oscillating operations automatically and in sequence.

15. Apparatus for curing belting or the like in a two-step process, the apparatus including a drum and a metallic band presenting two arcuately curved heated surfaces maintained in high pressure vulcanizing contact with the opposed faces of the belting to be cured and moving continuously therewith in one direction at a speed which delivers the belting therefrom in uniformly semi-cured condition, a separate drum having a heated surface to which said pressure band passes directly with the semi-cured belting supported thereon, a flexible pressure member passing about said second drum with the belting maintained under pressure between said metallic band and said flexible member, and means for heating said pressure member whereby the belting is delivered therefrom continuously in condition fully cured uniformly.

16. A method of curing belting or the like in a two-step process, which consists in continuously passing the belting longitudinally along a predetermined path defined in one part by two arcuately curved heated surfaces in high pressure vulcanizing contact with the opposed faces of the belting and moving continuously therewith in one direction at a speed which delivers the belting therefrom in uniformly semi-cured condition, transferring the semi-cured belting to a second part of said path by continuing its movement while supporting it on and in continuous contact with one of said moving surfaces, continuing the movement of the semi-cured belting longitudinally through said second part of the path while supporting it by and between the said one moving surface and a third surface in high pressure contact with opposed faces of the belting, and so maintaining said contact along the second named part of the path and heating said surfaces that the belting is delivered therefrom continuously in condition fully cured uniformly.

THOMAS M. KNOWLAND.
WILLIAM C. BLEHER.